(12) United States Patent
Yang

(10) Patent No.: US 6,185,082 B1
(45) Date of Patent: Feb. 6, 2001

(54) PROTECTION CIRCUIT FOR A BOOST POWER CONVERTER

(75) Inventor: Ta-yung Yang, Tao Yuan (TW)

(73) Assignee: System General Corporation, Milpitas, CA (US)

(*) Notice: Under 35 U.S.C. 154(b), the term of this patent shall be extended for 0 days.

(21) Appl. No.: 09/323,481

(22) Filed: Jun. 1, 1999

(51) Int. Cl.$^7$ .................................................... H02H 3/20
(52) U.S. Cl. ......................... 361/90; 361/91.1; 361/93.1; 361/93.7; 361/79; 361/83; 361/18; 323/285
(58) Field of Search ..................... 361/90, 91.1, 91.2, 361/91.3, 91.5, 91.6, 93.1, 93.7, 94, 79, 83, 86, 87; 323/284, 285, 274–277

(56) References Cited

U.S. PATENT DOCUMENTS

| | | |
|---|---|---|
| 4,958,121 * | 9/1990 | Cuomo et al. .......................... 323/224 |
| 5,180,964 * | 1/1993 | Ewing ................................... 323/222 |
| 5,357,395 | 10/1994 | Bissell et al. . |
| 5,422,593 | 6/1995 | Fujihira . |
| 5,585,991 | 12/1996 | Williams . |
| 5,615,097 | 3/1997 | Cross . |
| 5,723,974 | 3/1998 | Gray . |
| 5,726,845 | 3/1998 | Ho . |
| 5,754,419 | 5/1998 | Ho . |
| 5,767,545 | 6/1998 | Takahashi . |
| 5,844,440 | 12/1998 | Lenk et al. . |
| 5,861,737 | 1/1999 | Goerke et al. . |
| 5,869,935 | 2/1999 | Sodhi . |
| 5,969,515 * | 10/1999 | Oglesbee ............................... 323/283 |
| 5,986,902 * | 11/1999 | Brkovic et al. ........................ 363/50 |
| 6,028,755 * | 2/2000 | Saeki et al. ........................... 361/91.1 |
| 6,046,896 * | 4/2000 | Saeki et al. ............................ 361/86 |

OTHER PUBLICATIONS

"Switchmode Power Supply Handbook", McGraw–Hill Book Co., Keith H. Billings, pp. 162–166 (No Date).
"Switching Power Supply Design," McGraw–Hill Cook Co., Abraham I. Pressman, pp. 24–35 (No Date).

* cited by examiner

Primary Examiner—Michael J. Sherry

(57) ABSTRACT

A protection circuit for a boost power converter provides input under-voltage protection and output over-voltage and over-current protection. The protection circuit includes a control power MOSFET connected in series between the ground of the boost power converter and the ground of the load. The arrangement of the circuit makes it easy to drive the gate of an N-channel power MOSFET and is ideal for current-limiting control, which utilizes the Rds-on of the MOSFET as a current sensing element. Neither a specific gate-driver nor a current sensing resistor is required, and thus high efficiency can be achieved. Furthermore, the slow slew-rate at the gate of the MOSFET provides a soft-start to the load. The protection circuit includes a temperature compensation circuitry to offset the variation of the Rds-on. A time delay circuit prevents the switching elements and protection elements from overload damage.

7 Claims, 4 Drawing Sheets

US 6,185,082 B1

PROTECTION CIRCUIT FOR A BOOST POWER CONVERTER

BACKGROUND OF THE INVENTION

1. Field of Invention

The present invention relates to boost power converters ("boost converters"), and more particularly to a protection circuit of a boost converter which provides under-voltage, over-voltage, and over-current protection.

2. Background of the Invention

A boost converter is typically used to produce a higher regulated voltage from a lower unregulated voltage, including power factor correction (PFC) and DC-to-DC boost regulation. Several publications explain the operation of boost converters, such as: (a) Keith H. Billings, "Switchmode Power Supply Handbook," McGraw-Hill Book Co., p2.162–p2.166; and (b) Abraham I. Pressman, "Switching Power Supply Design," McGraw-Hill Book Co., p24–p35.

An example of a conventional boost converter 10 is shown in FIG. 1. The boost converter 10 includes a transistor Q1, inductor L1, diode D1, capacitor C1 and a PWM controller 12. The inductor L1 is connected in series with VIN and the transistor Q1. When the transistor Q1 is on for a time Ton, diode D1 is reverse biased and an energy $(0.5*L1*Ion^2)$ is stored in L1, where Ion=VIN*Ton/L1. During the transistor Q1 off time, the stored energy of L1 feeds the capacitor C1 through diode D1. Thus, controlling the Ton in the PWM controller 12 regulates the output voltage Vo.

Most power supply specifications require protection against the following common occurrences: (1) shorts to ground or overload currents, which can destroy the switching element and series-pass element; (2) output over-voltage, which can destroy voltage-sensitive loads; and (3) input under-voltage, which can not deliver sufficient power to the output and potentially will overheat the switching element. For the boost converter 10 shown in FIG. 1, when the input voltage VIN is higher than the specified output voltage Vo, the PWM controller 12 and the transistor Q1 will stop the boost switching due to feedback, but this high input voltage may unrestrainedly go into the output. Further, if the output of the boost converter 10 is shorted to ground, an unlimited current might flow from input to the output through the diode D1.

To address these concerns, protection switches, such as the conventional protection switch shown in FIG. 2, have been implemented. In the configuration shown in FIG. 2, a MOSFET Qp serves as a protection switch. The drain of the MOSFET Qp is connected to the positive output of the boost converter 10. The gate of the MOSFET Qp is connected to a gate driver 14 for driving the MOSFET Qp on, and the source of the MOSFET Qp is coupled to the load through a current sense resistor Rs. The output current IO flowing through the resistor Rs will produce a voltage drop Vrs. The resistors Ra, Rb, Rc and Rd form a voltage divider network for the voltage drop Vrs for providing an over-current signal to a control circuit 16. When the input voltage is higher than a specific level and/or the output is shorted to ground, the control circuit 16 will shut off the MOSFET Qp through the gate driver 14 to protect the boost converter 10 and the load.

Since a typical N-channel MOSFET produces lower loss, as compared to a P-channel device, the MOSFET Qp is generally an N-channel device. However, the drawback of using an N-channel device is that a specific gate driver must be applied to ensure that the MOSFET is fully turned-on. To turn-on the MOSFET, the gate-to-source voltage Vgs must be higher than a threshold voltage. If a lower on-state resistance (drain-to-source), Rds-on, of the MOSFET is needed, more Vgs voltage should be applied to the MOSFET. Although many methods can be used to drive the MOSFET, such as level-shift, charge-pump and floating source, the utilization of such methods increases the complexity of the circuit.

SUMMARY OF THE INVENTION

An object of the present invention is to provide a protection circuit in a boost converter for input under-voltage protection and output over-voltage and over-current protection. An advantage of the present invention is the arrangement of a circuit, which drives a protection switch of an N-channel MOSFET without requiring a specific gate driver, and, furthermore, provides a soft-start to the load. Another advantage of the present invention is a current sensing design that senses the current by using the Rds-on of the MOSFET, thereby improving the efficiency of the circuit.

In accordance with an embodiment of the present invention, the protection circuit includes a MOSFET that is connected in series between the ground of the boost converter and the ground of the load. Associated with a comparator, the MOSFET can be shut off when the input of the boost converter is in an under-voltage or over-voltage state. When the MOSFET is on, the current sensing circuit detects the output current of the boost converter by sensing the voltage drop across the MOSFET. Current limiting is achieved by restricting the PWM switching of the boost converter when a specified limit is reached. Nevertheless, if the output current is outside of a control range, the MOSFET can be shut off to stop the output whenever the absolute limit is reached. Since the Rds-on of the MOSFET is a function of its operating temperature, temperature compensation circuitry is employed to offset the variation of the Rds-on for the current limiting. A time delay circuit is applied to delimitate the duty cycle of overload which prevents the boost converter, the MOSFET, and a transient voltage suppressor from over-stress damage. The transient voltage suppressor is used to protect the load from power line fluctuations, spark discharge, and lighting surge.

Further scope and applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood by the accompanying drawings, which are given by way of illustration only, and thus are not limitative of the present invention, and wherein.

DETAILED DESCRIPTION OF PREFERRED EMBODIMENT

The present invention is a protection circuit of a boost converter, which provides input under-voltage, output over-voltage, and output over-current protection.

Figure 1:
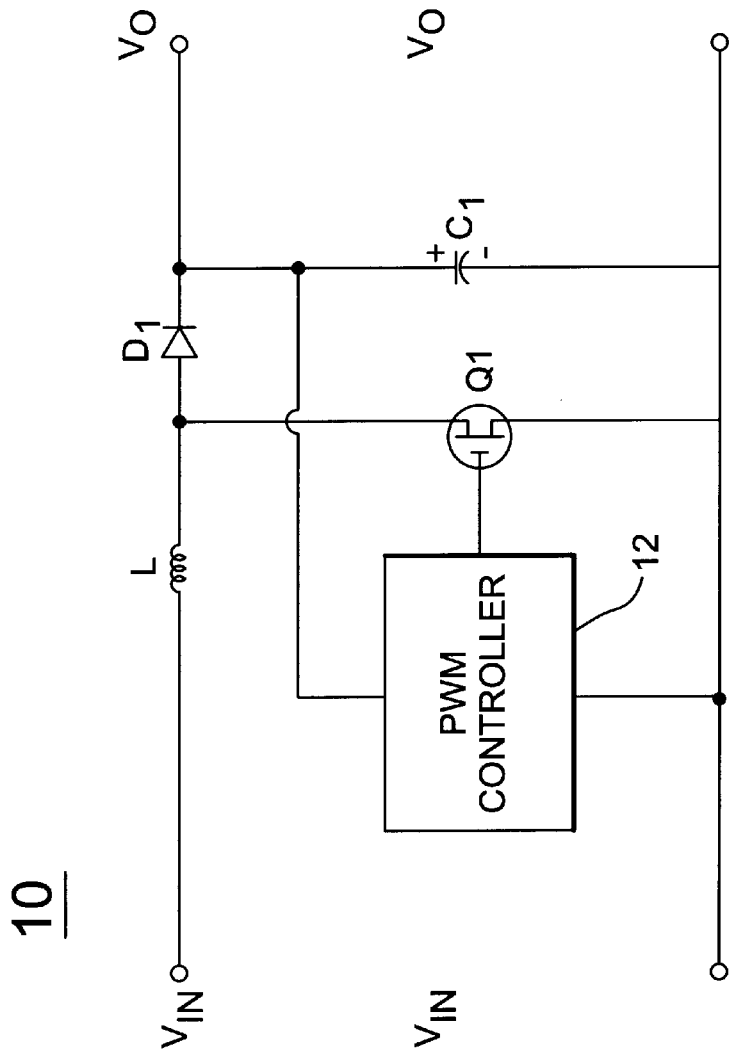
FIG. 1 is a simplified circuit diagram illustrating a prior art boost converter.
Figure 2:
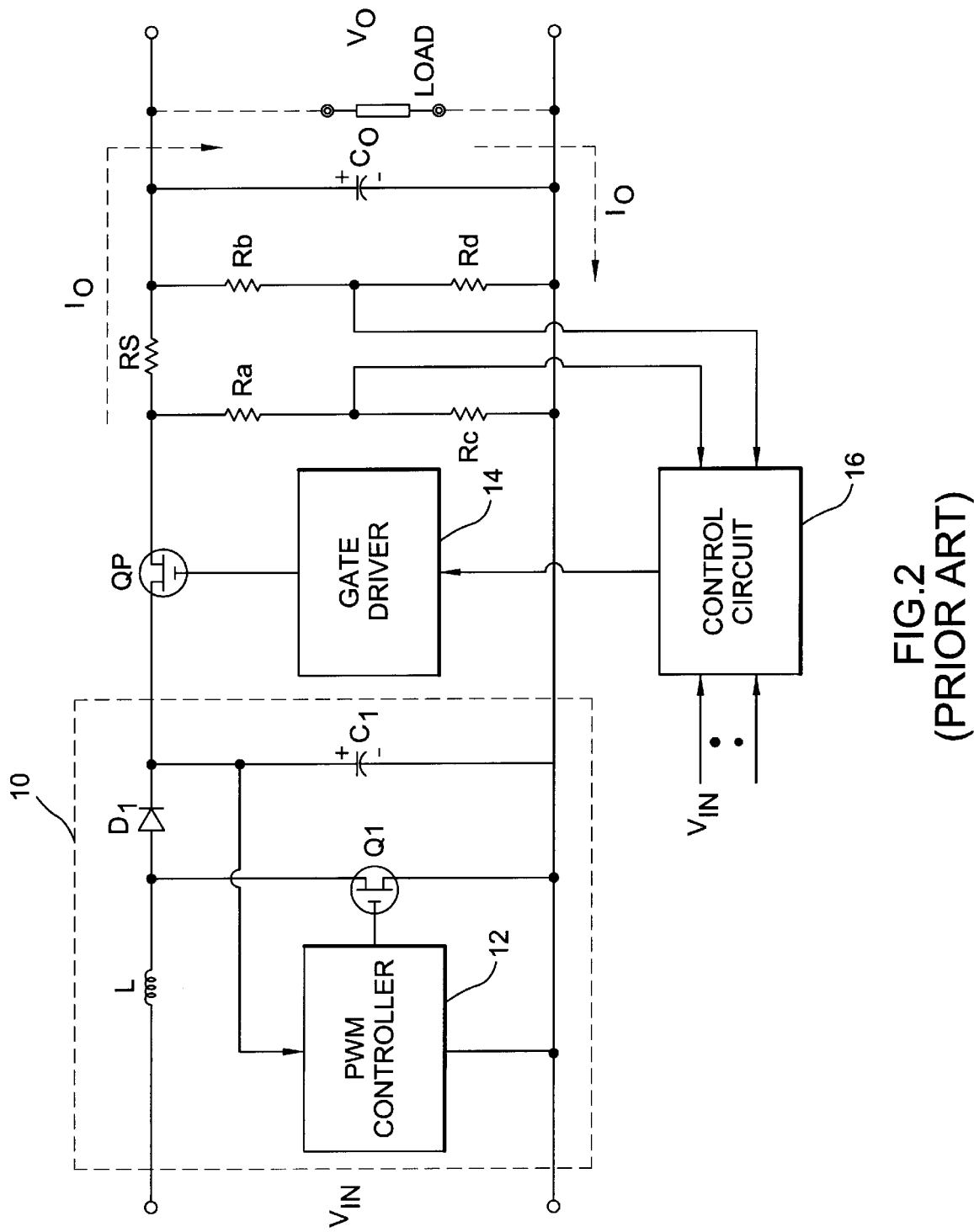
FIG. 2 is a circuit diagram of a prior art protection circuit.
Figure 3:
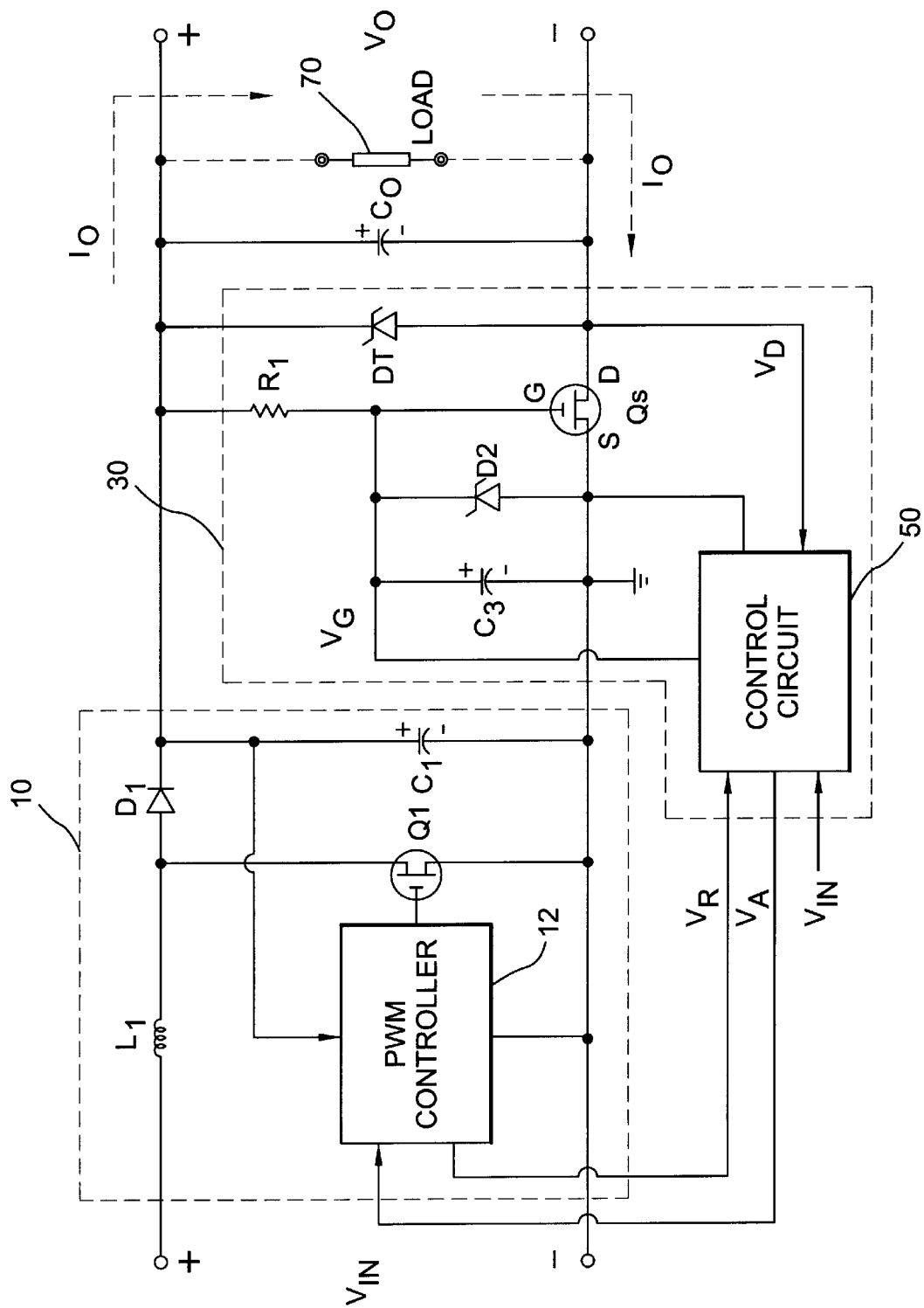
FIG. 3 is a schematic diagram, partly in block form, showing a preferred embodiment of the present invention.

FIG. 3. is a circuit diagram showing a preferred embodiment of the present invention. The protection circuit 30 includes a power MOSFET Qs connected in series between the ground of a boost converter 10 and the ground of a load 70. The source of the MOSFET Qs is linked to the ground of the boost converter 10, and the drain of the MOSFET Qs is connected to the ground of the load 70. A resistor R1 is connected from the positive output of the boost converter 10 to the gate of the MOSFET Qs for driving the MOSFET Qs on. A capacitor C3 is connected between the gate and source of MOSFET Qs. The capacitor C3 acts with the resistor R1 to provide a slow slew-rate for powering on the MOSFET Qs and to soft-start the load. A zener diode D2 is connected in parallel with the capacitor C3 to clamp the gate-voltage of the MOSFET Qs under its maximum rating.

The protection circuit 30 further includes a control circuit 50 which has two outputs, namely a gate signal VG and an amplified signal VA, and two inputs, namely an input voltage VIN and a voltage drop VD. The gate signal VG is connected to the gate of the MOSFET Qs for shutting off the MOSFET Qs. The amplified signal VA is coupled to the PWM controller 12 of the boost converter 10 for current limiting control. The input voltage VIN is the input of the boost converter 10, which is linked to the control circuit 50 for under-voltage and over-voltage detection. The output current IO flowing through the MOSFET Qs produces a voltage drop VD that is caused by the Rds-on of the MOSFET Qs. The voltage drop VD across the MOSFET Qs is used to sense the output current IO for the control circuit 50. The ground of the control circuit 50 is connected to the source of the MOSFET Qs, which is same as the ground of the boost converter 10. The control circuit 50 is powered by a regulated voltage source VR that is an output of the PWM controller 12. An output capacitor Co is connected in parallel with the load 70, which provides better performance for dynamic loading and higher immunity to noise and surge. A transient voltage suppressor DT is connected in parallel with the load 70 for transient voltage protection.

Figure 4:
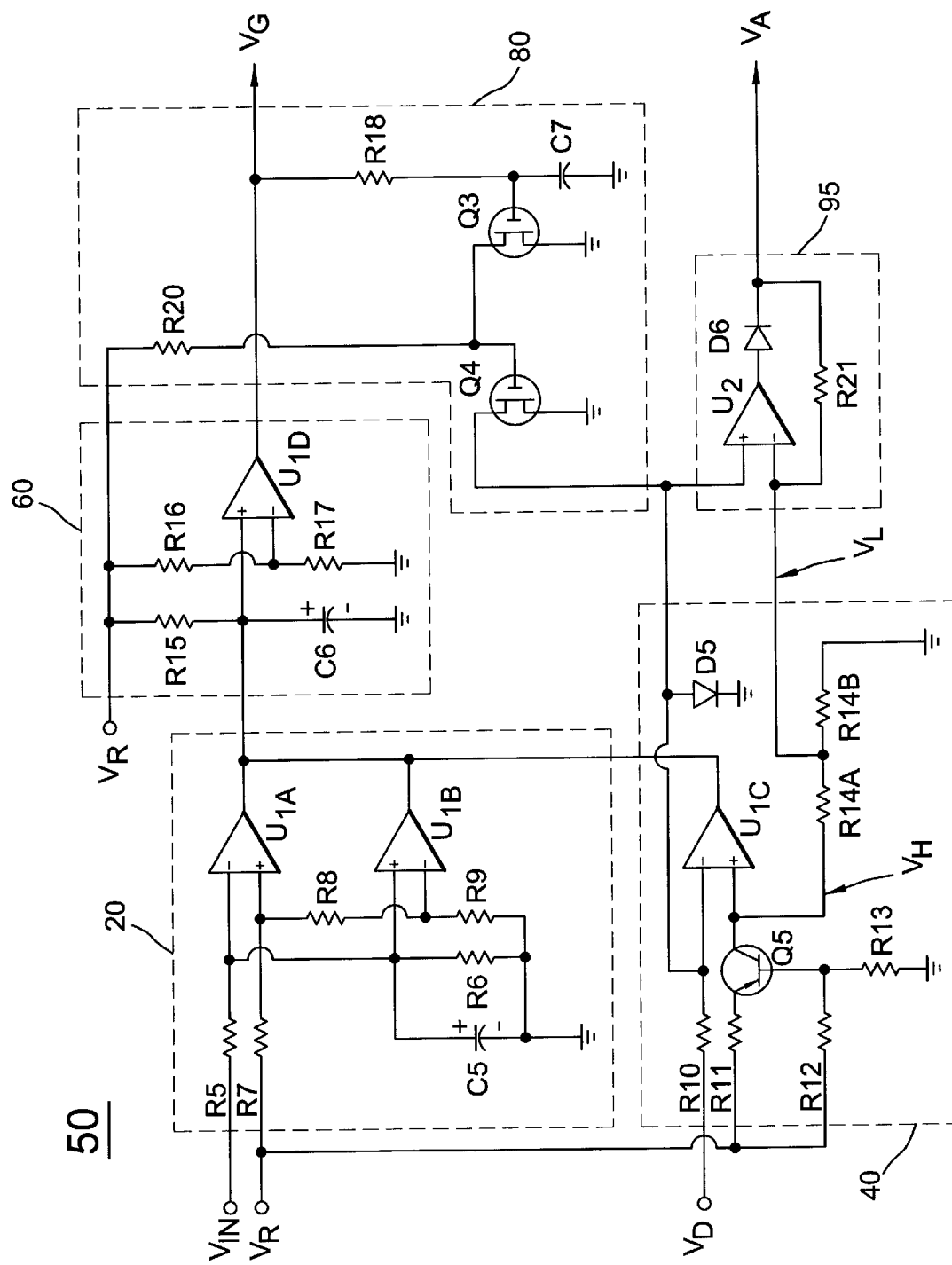
FIG. 4 is a detailed schematic of a control circuit, according to an embodiment of the present invention.

FIG. 4 is a detailed schematic of the control circuit 50, according to an embodiment of the present invention. The control circuit 50 includes a voltage detector 20, a current detector 40, a time delay circuit 60, an on-state detector 80, and an amplifier 95. The voltage detector 20 is used to detect the over-voltage and under-voltage of the input voltage VIN. The current detector 40 is used to detect an over-current state of the output current IO. The output of the voltage detector 20 is connected with the output of the current detector 40 to initiate the protection. The time delay circuit 60 provides a delay to extend the active cycle of protection. The on-state detector 80 enables the current detector 40 only during the on-state of the MOSFET Qs. The amplifier 95 amplifies an over-current signal and drives the PWM controller 12 to achieve current limiting control.

The voltage detector 20 includes a comparator U1A for over-voltage detection and a comparator U1B for under-voltage detection. Via a resistor R5, the input voltage VIN is coupled to the negative input of the comparator U1A and the positive input of the comparator U1B. A resistor R6 in parallel with a capacitor C5 are connected between the resistor R5 and ground. A voltage divider network consisting of resistors R7, R8 and R9 is connected between the regulated voltage source VR and ground, thereby resulting in a higher reference voltage at the positive input of the comparator U1A and producing a lower reference voltage at the negative input of the comparator U1B. The outputs of the comparator U1A and U1B are connected together, which is the output of the voltage detector 20.

The current detector 40 includes a comparator U1C. The voltage drop VD is connected to the negative input of the comparator U1C through a resistor R10. A diode D5 is connected between the negative input of the comparator U1C and ground to protect the input of comparator U1C under its maximum rating. A pnp transistor Q5 forms a temperature compensation circuit. A resistor R11 and a resistor R12 are connected from the regulated voltage source VR to the emitter and the base of the transistor Q5 respectively. A resistor R13 is connected between the base of the transistor Q5 and ground to provide a bias for temperature compensation. The collector of the transistor Q5 is coupled to the positive input of the comparator U1C. A resistor R14A and a resistor R14B in series are connected between the positive input of the comparator U1C and ground, which produces a high reference voltage VH at the positive input of the comparator U1C and produces a low reference voltage VL for output to the amplifier 95. The voltage VH is higher than the voltage VL. The output of the comparator U1C is the output of the current detector 40.

The time delay circuit 60 includes a comparator U1D. The output of the voltage detector 20 and the output of the current detector 40 are connected to the positive input of the comparator U1D. A resistor R15 and a capacitor C6 in series are connected between the regulated voltage source VR and ground. The junction of the resistor R15 and the capacitor C6 is connected to the positive input of the comparator U1D for providing a time delay. A voltage divider consisting of resistors R16 and R17 is connected between the regulated voltage source VR and ground, which provides a threshold reference voltage to the negative input of the comparator U1D. The output of the comparator U1D is the gate signal VG, which is connected to the gate of the MOSFET Qs.

The on-state detector 80 includes two small-power MOSFETs Q3 and Q4. Through a resistor R18, the gate signal VG drives the gate of the MOSFET Q3. A capacitor C7 is connected between the gate of the MOSFET Q3 and ground. The source of the MOSFET Q3 and the source of the MOSFET Q4 are grounded. The drain of the MOSFET Q3 is pulled high by a resistor R20 and is used to drive the gate of the MOSFET Q4. The drain of the MOSFET Q4 is connected to the negative input of the comparator U1C to enable or disable the current detector 40.

The amplifier 95 includes an operational amplifier U2. The positive input of the operational amplifier U2 is connected to the negative input of the comparator U1C for amplifying the voltage drop VD. The low reference voltage VL biases the negative input of the operational amplifier U2. Via a diode D6, the output of the operational amplifier U2 drives the PWM controller 12 of the boost converter 10 to achieve current limiting control. A resistor R21 is connected between the cathode of the diode D6 (VA) and the negative input of the operational amplifier U2 to determine the gain of the amplifier 95. The comparators U1A, U1B, U1C and U1D have open collector outputs such as that of a comparator LM339.

Operation

The operation of the protection switch 30 for the boost converter 10 as shown in FIG. 3 and FIG. 4 in accordance with the present invention is as follows:

The MOSFET Qs can be turned-on while the gate-to-source voltage of the MOSFET is higher than its gate threshold voltage VT. By connecting the resistor R1 from the output of the boost converter 10 to the gate of the MOSFET Qs, the MOSFET Qs turns on as long as the output voltage VO is higher than the threshold voltage VT. The resistor R1 incorporated with the capacitor C3 provides a slow slew-rate for powering-on the MOSFET Qs, which minimizes the input inrush current and soft-starts the load whenever the boost converter is powering on or is recovering from protection. T1 expresses the time interval of soft-starting the load, and can be stated as:

$$T1=R1*C3*\ln[(VO-VT)/(VO-VZ2)], \quad (1)$$

where VZ2 is the zener voltage of the zener diode D2 at the gate of MOSFET Qs.

The output current IO flowing through the on-state MOSFET Qs will produce a voltage drop VD that can be expressed as:

$$VD=IO*Rds\text{-on}. \quad (2)$$

When the voltage drop VD is higher than the low reference voltage VL, the differential voltage VD−VL will be amplified to drive the PWM controller 12 for current limiting. Due to the PWM controller 12, switching is restricted while the output current is limited, and the output voltage VO may go down and become equal to the input voltage VIN. At that moment, if the MOSFET Qs can not be shut-off, a boundless current will flow from the input to the output through the diode D1. Therefore, the comparator U1C is designed to shut-off the MOSFET Qs when the voltage drop VD is higher than the high reference voltage VH. When the MOSFET Qs is shut-off, the voltage drop VD will be equal to the output voltage of the boost converter 10. Because this voltage may be too high to connect to the input of the comparator U1C, the resistor R10 and the diode D5 are used to clamp the voltage and protect the comparator U1C.

When the MOSFET Qs is shut-off, the voltage drop VD will latch the MOSFET Qs in the off state through the comparator U1C. The on-state detector 80 is used to disable the voltage drop VD and reset the latch. Low gate voltage VG will shut-off the MOSFETs Qs and Q3, in which the negative input of the comparator U1C will be pulled to ground through the turning-on of the MOSFET Q4. A high gate voltage VG will turn-on the MOSFET Qs. After the delay of resistor R18 and capacitor C7, the MOSFET Q3 will be turned-on, and the MOSFET Q4 will be shut-off to enable current detection. When the voltage detector 20 or the current detector 40 achieves protection, the time delay circuit 60 will shut-off the MOSFET Qs immediately and hold the MOSFET Qs in the off-state for a time of delay T2 which delimitates the duty cycle of overload. The delay time T2 can be expressed as:

$$T2=R15*C6*\ln[VR/(VR-Vx)], \quad (3)$$

where the $Vx=VR*[R17/(R16+R17)]$.

The transistor Q5 in the current detector 40 is used to compensate for variations in the Rds-on for current limiting. The Rds-on of the MOSFET has a positive temperature coefficient, i.e., as temperature increases, Rds-on also increases. This is a characteristic of all power MOSFETs. The Rds-on at a particular temperature can be stated as:

$$Rds\text{-on }(@T)=Rds\text{-on}*[1+K0*(T-T0)], \quad (4)$$

where the T0=25° C.; Rds-on is the Rds-on at 25° C.; and K0 is a constant derived from the curve of 'Rds-on versus temperature' on the data sheet of the MOSFET. Each type of MOSFET has a unique K0. The collector current of the transistor Q5, Ic-Q5, can be express as:

$$Ic\text{-}Q5=(VB-Vbe)/R11, \quad (5)$$

where the VB=VR*R12/(R12+R13); and Vbe is the base-to-emitter forward voltage of the transistor Q5. The Vbe of the transistor has a negative temperature coefficient, i.e., as temperature increases, Vbe decreases (−2.5 mV/° C.). The Vbe at a particular temperature can be stated as:

$$Vbe\ (@T)=Vbe*[1-K1*(T-T0)], \quad (6)$$

where the Vbe is the Vbe at 25° C. such as 0.63V; and K1 is a constant, for example 0.0025. The collector current of the transistor Q5 (Ic-Q5) produces the high/low reference voltage of VH and VL for the current limiting control, where:

$$VH=Ic\text{-}Q5*(R14A+R14B);\text{ and} \quad (7)$$

$$VL=Ic\text{-}Q5*R14B. \quad (8)$$

The voltage drop VD for the current limiting can be expressed as:

$$VD=IO*Rds\text{-on}*[1+K0*(T-T0)]=Ic\text{-}Q5*R14B. \quad (9)$$

Equation (5), (6) and (9) can be combined to become:

$$IO=(R14B/R11)*\{VB-Vbe*[1-K1*(T-T0)]\}/\{Rds\text{-on}*[1+K0*(T-T0)]\}. \quad (10)$$

In order to offset the variation which is caused by the temperature for the current limiting, the relationship between the output current IO and temperature T can be mathematically expressed as $\partial IO/\partial T=0$.
Taking the derivative of equation (10) results in:

$$\partial IO/\partial T=(R14B/R11)*Rds\text{-on}*(Vbe*K0+Vbe*K1-VB*K0). \quad (11)$$

Since $\partial IO/\partial T=0$, equation (11) can be expressed quantitatively as (Vbe*K0+Vbe*K1−VB*K0=0), so that VB=Vbe*(K0+K1)/K0. This can further be re-written as:

$$R12/(R12+R13)=(Vbe/VR)*[(K0+K1)/K0]. \quad (12)$$

By selecting the resistors R12 or R13 in equation (12), temperature compensation can be achieved. For example, if VR=5V, Vbe=0.63V, K0=0.005, K1=0.0025, and R12=5.1K ohm, then VB and R13 can be selected as 0.94V and 22K ohm respectively to offset the temperature variation of Rds-on for the current limiting.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A protection circuit for a boost power converter comprising:
   a transistor connected in series between a ground of said boost power converter and a ground of a load, said transistor having a source terminal, a drain terminal and a gate terminal, wherein the source terminal of said transistor is connected to the ground of said boost power converter, and the drain terminal of said transistor is connected to the ground of the load; and
   a control circuit having a first output coupled to the gate terminal of said transistor so as to shut-off said transistor, a second output coupled to a PWM controller of said boost power converter for current limiting, a first input coupled to the input of said boost power converter for sensing the input voltage of said boost power converter, and a second input coupled to the drain terminal of said transistor to sense a voltage drop across said transistor, wherein said voltage drop is produced by the current of the load to be protected and an on-state resistance, Rds-on, of said transistor.

2. The protection circuit in accordance with claim 1, wherein said control circuit comprises:

a voltage detector responsive to the input voltage of said boost power converter for generating a shut-down signal in response to over-voltage and under-voltage conditions;

a current detector responsive to said voltage drop for generating said shut-down signal in response to the over-current condition;

an amplifier responsive to said voltage drop for amplifying said voltage drop so as to restrict PWM switching of said boost power converter;

a time delay circuit responsive to said shut-down signal for shutting off said transistor rapidly and generating a delay time prior to turning-on of said transistor;

an on-state detector responsive to a gate voltage at the gate terminal of said transistor to enable said current detector in response to a high-state of said gate voltage, and disable said current detector in response to a low-state of said gate voltage.

3. The protection circuit in accordance with claim 2, wherein said current detector comprises:

a first comparator having an output connected with the output of said voltage detector for generating said shut-down signal;

a protected resistor connected from said voltage drop to a negative input of said first comparator;

a clamp diode connected between the negative input of said first comparator and ground;

a pnp transistor having a collector connected to a positive input of said first comparator for producing a reference current;

a mirror resistor connected between a regulated voltage source and an emitter of said pnp transistor;

a first-bias resistor connected between said regulated voltage source and a base of said pnp transistor;

a second-bias resistor connected between the base of said pnp transistor and ground, wherein said first-bias resistor and said second-bias resistor provide a bias for said pnp transistor and provide the temperature compensation for the Rds-on of said transistor;

a first-reference resistor in series with a second-reference resistor connected between the collector of said pnp transistor and ground, in which said first-reference resistor and said second-reference resistor act with said reference current to generate a high reference voltage at the positive input of said first comparator, and said second-reference resistor incorporated with said reference current generates a low reference voltage for said amplifier.

4. The protection circuit in accordance with claim 3, wherein said amplifier comprises:

an operational amplifier having a positive input coupled to the negative input of said first comparator, and a negative input coupled to said low reference voltage;

an output diode connected from the output of said operational amplifier to the PWM controller of said boost power converter, wherein the anode of said output diode is connected to the output of said operational amplifier; and a feedback resistor connected between the cathode of said output diode and the negative input of said operational amplifier for determining the gain of said amplifier.

5. The protection circuit in accordance with claim 3, wherein said on-state detector comprises:

a small MOSFET responsive to said gate voltage of said transistor;

a state resistor connected between the gate terminal of said transistor and a gate of said small MOSFET;

a state capacitor connected between the gate of said small MOSFET and ground;

a pull-high resistor connected from said regulated voltage source to a drain of said small MOSFET; and a signal MOSFET having a gate, a source, and a drain, wherein the gate of said signal MOSFET is coupled to the drain of said small MOSFET, and the drain of said signal MOSFET is coupled to the negative input of said first comparator, and the source of said signal MOSFET and a source of said small MOSFET are connected to ground.

6. The protection circuit in accordance with claim 2, wherein said time delay circuit comprises:

a delay circuit comparator having a positive input coupled to the output of said current detector and the output of said voltage detector, a negative input coupled to a threshold reference voltage, and an output connected to the gate terminal of said transistor; and a delay-time resistor in series with a delay-time capacitor connected between a regulated voltage source and ground, and the junction of said delay-time resistor and said delay time capacitor being connected to a positive input of said delay circuit comparator.

7. The protection circuit in accordance with claim 1, further comprising:

a gate resistor connected between a positive output of said boost power converter and the gate terminal of said transistor for driving said transistor;

a gate capacitor connected between the gate terminal and the source terminal of said transistor to soft-start said transistor;

a zener diode connected between the gate terminal and the source terminal of said transistor to protect said transistor; and a transient voltage suppressor connected in parallel with the load to protect the load.

* * * * *